US011704585B2

(12) United States Patent
Chen et al.

(10) Patent No.: US 11,704,585 B2
(45) Date of Patent: Jul. 18, 2023

(54) SYSTEM AND METHOD TO DETERMINE OUTCOME PROBABILITY OF AN EVENT BASED ON VIDEOS

(71) Applicant: CLIPr Co., Kirkland, WA (US)

(72) Inventors: Humphrey Chen, Norwood, NJ (US); Cindy Chin, New York, NY (US); Aaron Sloman, Costa Mesa, CA (US)

(73) Assignee: CLIPr Co., Kirkland, WA (US)

( * ) Notice: Subject to any disclaimer, the term of this patent is extended or adjusted under 35 U.S.C. 154(b) by 324 days.

(21) Appl. No.: 17/317,643

(22) Filed: May 11, 2021

(65) Prior Publication Data

US 2022/0366283 A1 Nov. 17, 2022

(51) Int. Cl.

| | | |
|---|---|---|
| *G06N 3/091* | (2023.01) | |
| *G06V 20/40* | (2022.01) | |
| *G10L 15/08* | (2006.01) | |
| *G10L 15/25* | (2013.01) | |
| *G10L 17/00* | (2013.01) | |
| *G10L 17/04* | (2013.01) | |
| *G06N 7/01* | (2023.01) | |
| *G06N 20/00* | (2019.01) | |
| *G06T 11/20* | (2006.01) | |
| *G10L 15/18* | (2013.01) | |
| *G10L 15/22* | (2006.01) | |
| *G10L 25/57* | (2013.01) | |

(52) U.S. Cl.
CPC ............... *G06N 7/01* (2023.01); *G06N 20/00* (2019.01); *G06T 11/206* (2013.01); *G06V 20/41* (2022.01); *G06V 20/46* (2022.01); *G10L 15/1815* (2013.01); *G10L 15/22* (2013.01); *G10L 25/57* (2013.01); *G06V 20/44* (2022.01); *G10L 2015/088* (2013.01)

(58) Field of Classification Search
USPC ................ 382/103–107, 115–123, 154–159; 704/1–275; 706/1–62, 900
See application file for complete search history.

(56) References Cited

U.S. PATENT DOCUMENTS

| 9,269,374 B1 | 2/2016 | Conway et al. | |
|---|---|---|---|
| 2016/0352907 A1* | 12/2016 | Raanani | H04M 3/5232 |
| 2021/0076002 A1 | 3/2021 | Peters et al. | |
| 2021/0133670 A1* | 5/2021 | Cella | G06N 3/044 |
| 2022/0366494 A1* | 11/2022 | Cella | G06Q 30/0201 |

OTHER PUBLICATIONS

International Search Report and Written Opinion of the International Searching Authority for PCT/US2021/032172 dated Jan. 21, 2022, 12 pages.

* cited by examiner

*Primary Examiner* — Marcellus J Augustin
(74) *Attorney, Agent, or Firm* — Lowenstein Sandler LLP

(57) ABSTRACT

System and method for determining an outcome probability of an event based on videos are disclosed. The method includes receiving the videos of an event, creating a building block model, extracting one of an audio content, a video content from the videos, analysing extracted content, generating an analysis result, analysing an engagement between speaker and participant of event, generating a data lake comprising a keyword library, computing the outcome probability of the event, enabling the building block model to learn from the data lake and the outcome probability computed and representing the at least one outcome probability in a pre-defined format.

16 Claims, 5 Drawing Sheets

SYSTEM AND METHOD TO DETERMINE OUTCOME PROBABILITY OF AN EVENT BASED ON VIDEOS

FIELD OF INVENTION

Embodiments of a present disclosure relate to outcome probability analysis, and more particularly, to a system and method to determine outcome probability of an event based on videos and representation of the same.

BACKGROUND

Probability analysis is defined as a technique used for forecasting future outcomes of an event. In case of any event, it becomes very important to analyse and understand what the outcome of the event was. Based on the outcome, participants of the event may learn multiple requirements and try to enhance the performance for the upcoming events. One such traditional way of analysing the outcome is a manual way where an organizer or any interested person may manually interact with each of the participants of the user and understand a point of view and experience of the event. On collecting such data, the interested person needs to sit and analyse the opinion of the majority of the crowd and conclude on what the outcome of the event was and also the positive and negative factors of the event. These factors may be presented to the participants for their batter understanding. However, such ways of analysing the outcomes are time consuming and are prone to human errors. Also, the participants may be hesitant in providing the feedback or may not provide the complete information at all, due to which the outcome may be less accurate, thereby making such an approach less reliable and less efficient. In addition, the representation of the outcome may not be presented in a systematic way which may again lack the accuracy of the outcome, henceforth determining the probability with such data is not very reliable.

Hence, there is a need for an improved system and method to determine outcome probability of an event based on videos to address the aforementioned issues.

BRIEF DESCRIPTION

In accordance with one embodiment of the disclosure, a system to create a video summary is disclosed. The system includes one or more processors. The system also includes a video input module configured to receive the one or more videos representative of the corresponding at least one event. The system also includes a building block creation module configured to create a building block model using one of an artificial intelligence technique, a machine learning technique or a combination thereof. The system also includes a video analysis module configured to extract one of an audio content, a video content or a combination thereof from the corresponding one or more videos. The video analysis module is also configured to analyse extracted audio content and extracted video content using one of an image processing technique, the machine learning technique, the artificial intelligence technique, a face recognition technique, a voice recognition technique, or a combination thereof. The video analysis module is also configured to generate an analysis result. The system also includes an engagement analysis module configured to analyse an engagement between at least one speaker and at least one participant responsible for the event captured in the corresponding one or more videos, based on the analysis result. The system also includes an outcome probability calculation module configured to generate a data lake comprising a keyword library based on the analysis result and an analysed engagement. The outcome probability calculation module is also configured to compute the at least one outcome probability of the event using the building block model and a probability input received from one or more users. The system also includes a building block enhancement module configured to enable the building block model to learn from the data lake and the at least one outcome probability computed, using the machine learning technique, to generate an enhanced building block model.

In accordance with another embodiment of the disclosure, a method for creating a video summary is disclosed. The method includes receiving the one or more videos representative of the corresponding at least one event. The method also includes creating a building block model using one of an artificial intelligence technique, a machine learning technique or a combination thereof. The method also includes extracting one of an audio content, a video content or a combination thereof from the corresponding one or more videos. The method also includes analysing extracted audio content and extracted video content using one of an image processing technique, the machine learning technique, the artificial intelligence technique, a face recognition technique, a voice recognition technique, or a combination thereof. The method also includes generating an analysis result. The method also includes analysing an engagement between at least one speaker and at least one participant responsible for the event captured in the corresponding one or more videos, based on the analysis result. The method also includes generating a data lake comprising a keyword library based on the analysis result and an analysed engagement. The method also includes computing the at least one outcome probability of the event using the building block model and a probability input received from one or more users. The method also includes enabling the building block model to learn from the data lake and the at least one outcome probability computed, using the machine learning technique, for generating an enhanced building block model. The method also includes representing the at least one outcome probability in a pre-defined format.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which.

Figure 1:
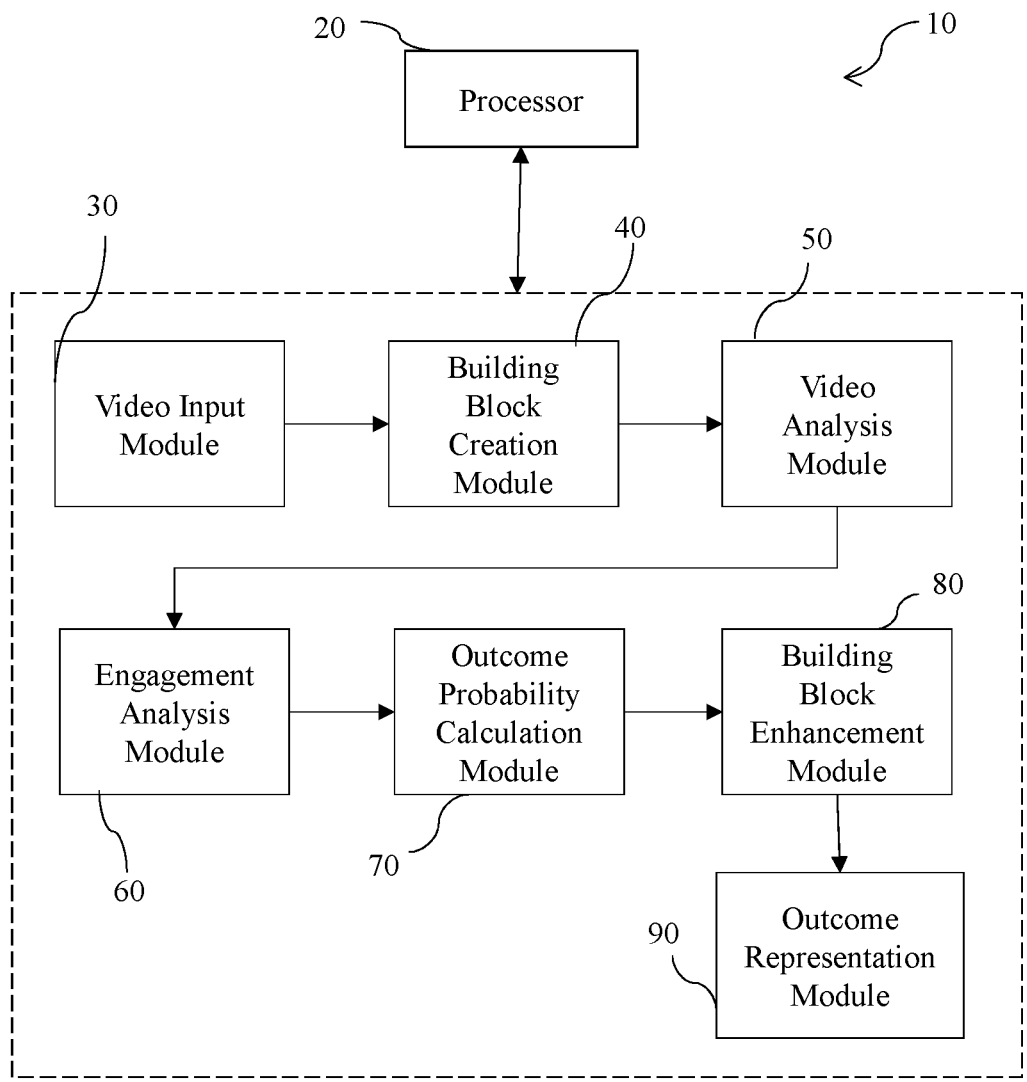
FIG. 1 is a block diagram representation of a system to determine at least one outcome probability of an event based on one or more videos in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or sub-systems or elements or structures or components preceded by "comprises . . . a" does not, without more constraints, preclude the existence of other devices, sub-systems, elements, structures, components, additional devices, additional sub-systems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Embodiments of the present disclosure relate to a system and method for determining at least one outcome probability of an event based on one or more videos. As used herein, the term 'probability' is defined as an extent to which something is likely to happen or be the case. More specifically, it can also be defined as branch of mathematics concerning numerical descriptions of how likely an event is to occur, or how likely it is that a proposition is true.

FIG. 1 is a block diagram representation of a system 10 to determine at least one outcome probability of an event based on one or more videos in accordance with an embodiment of the present disclosure. In one embodiment, the event may include one of a seminar, a meeting, an educational gathering, a social gathering or a private gathering. The system 10 includes one or more processors 20. The system 10 also includes multiple modules which are operable by the one or more processors 20. The system 10 also includes a video input module 30 is configured to receive the one or more videos representative of the corresponding at least one event. In one embodiment, the one or more videos may be received from one or more sources from one or more users.

In one exemplary embodiment, the one or more sources may include at least one of an internal source, an external source or a combination thereof. Here, in one embodiment, the internal source may include a storage unit within the platform. In another embodiment, the internal storage may be a storage unit within a user device through which a corresponding one or more users may be accessing the platform. In such embodiment, the user device may be a computing device such as a laptop, a tablet, a mobile phone, or the like. Further, in one exemplary embodiment, the one or more external sources may include a storage unit which may not be synced with the platform or with the user device. In such embodiment, the one or more videos may be transmitted to the video input module 30 via a communication medium. In one exemplary embodiment, the communication medium may be a wired communication medium or a wireless communication medium.

In some embodiment, the one or more videos may be transferred or transmitted to the video input module 30 or may retrieve the one or more videos automatically based on certain pre-defined set of instructions. In one embodiment, the pre-defined set of instructions may include at least one of a date, a day, a place, a type of event, a specific person, a specific group of people, keywords, highlights or the like. In such embodiments, the video input module 30 may use a crawler to crawl the storage unit in order to access the one or more videos upon applying the pre-defined set of instructions on the storage unit. The pre-defined set of instructions may be set by an authorized user or by the corresponding one or more users.

In one specific embodiment, the one or more videos may be streamed into the video input module 30 in real time. More specifically, the analysis of the one or more video may be streamed into the video input module 30 as and when the even is happening in real time.

The system 10 also includes a building block creation module 40 configured to create a building block model using one of an artificial intelligence technique, a machine learning technique or a combination thereof. In one embodiment, the building block model is associated with the corresponding one or more videos. As used herein, the term "artificial intelligence (AI)" is defined as an intelligence demonstrated by machines to perform or mimic human intelligence and human behavior. Also, the term "Machine learning (ML)" is defined as a study of computer algorithms that improve automatically through experience upon leaning using a built model which is based on a sample set of data. In one exemplary embodiment, the AI technique may include a natural language processing technique. In one embodiment, the ML technique may include one of a supervised technique.

Furthermore, the system 10 includes a video analysis module 50 configured to extract one of an audio content, a video content or a combination thereof from the corresponding one or more videos. In one embodiment, the content may be extracted based on a pre-defined set of extraction instruction or a pre-defined set of extraction rules which may be defined by the authorized user or the corresponding one or more users.

The video analysis module 50 is also configured to analyse extracted audio content and extracted video content using one of an image processing technique, the machine learning technique, the artificial intelligence technique, a face recognition technique, a voice recognition technique, or a combination thereof. As used herein, the term 'image processing technique' is defined as a method or a technique to perform some operations on an image or a video, in order to extract some useful information from the one or more videos. Also, the term 'face recognition technique' is defined as a method of matching a human face from a digital image or a video frame against a database of faces. More specifically, the faces of the one or more users may be stored in a database, and may be retrieved by the video analysis module 50 to analyse the one or more videos. In one embodiment, the image processing technique may also be used to analyse expressions of the one or more users in the corresponding one or more videos. Further, the term 'voice recognition technique' also known as speech recognition is defined as an interdisciplinary subfield of computer science and computational linguistics that develops methodologies and technologies that enable the recognition and translation of spoken language into text by computers. It is also known as automatic speech recognition (ASR), computer speech recognition or speech to text (STT). In one embodiment, the voice recognition technique may also be used to identify a tone of the voice, a type of language used, a prosody of the voice, kindly of words used, content of communication, or the like by the one or more users in the corresponding one or more videos.

The video analysis module 50 is also configured to generate an analysis result. Referring to the above-mentioned embodiments, upon analysing the content of the one or more videos, conversation among the one or more users, or the like, the video analysis module 50 generated the analysis result representative of all the kinds of analysis done. In one embodiment, the kind of analysis to be performed on the one or more videos may be pre-defined or may be customized based on the requirement. In one exemplary embodiment, one or more categories in the analysis result may also be pre-defined or may be customized based on the requirement.

Furthermore, the system 10 includes an engagement analysis module 60 is configured to analyse an engagement between at least one speaker and at least one participant responsible for the event captured in the corresponding one or more videos, based on the analysis result. In one embodiment, the engagement between the speaker and the participant may be analysed based on the analysis report which is generated by the video analysis module 50 using one of the AI or the ML techniques. It should be noted that the at least one speaker and the at least one participant correspond to the one or more users. As used herein, the term 'engagement' is defined as an action of participating in a communication or an act of engaging. Here, the communication and the interaction between the at least one speaker and the at least one participant is defined as engagement. In one specific embodiment, the engagement analysis module 60 may be further configured to analyse sentiment of the one or more users in the corresponding one or more videos. In such embodiment, the sentiment may be analysed using a sentiment analysis technique. As used herein, the term 'sentiment analysis technique' is defined as a technique which uses natural language processing, text analysis, computational linguistics, and biometrics to systematically identify, extract, quantify, and study affective states and subjective information. Sentiment analysis is widely applied to voice data.

The system 10 also includes an outcome probability calculation module 70 configured to generate a data lake comprising a keyword library based on the analysis result and an analysed engagement. In one embodiment, the data lake may include keywords which may be extracted from the one or more videos which may be used by the one or more users. In one exemplary embodiment, the outcome probability calculation module 70 may perform an analysis on the data lake to analyse a pattern of keywords being used in the one or more videos. Furthermore, the outcome probability calculation module 70 may be configured to match an outcome of the sentiment analysis with an analysis result of the keywords analysis.

Further, the outcome probability calculation module 70 is configured to compute the at least one outcome probability of the event using the building block model and a probability input received from the one or more users. In one embodiment, computing the probability may include generating a menu comprising one or more moments, the pattern of keywords, one or more highlights, sentiment between the one or more users, or the like. In one exemplary embodiment, the probability input may be a feedback given by the one or more users post the event. Here, the feedback may be matched with the analysis made using the building block module to compute the outcome probability. In some embodiment, the outcome probability may include one of the engagement, the sentiment, keywords used, between the at least one speaker and the at least one participant, or between the one or more users. In one specific embodiment, the outcome probability may include one of customer purchase, high performer, weak performer, employee leaving, depression, substance abuse, or the like.

The system 10 also includes a building block enhancement module 80 configured to enable the building block model to learn from the data lake and the at least one outcome probability computed, using the machine learning technique, to generate an enhanced building block model. In one embodiment, if the computation of any probability may be missed by the building block model while analysing the outcome probability, the building block enhancement module 80 enables the building block model to learn from one or feedbacks which may be received from the one or more users.

In one exemplary embodiment, the system 10 may further include a data lake enhancement module which may be configured to enhance the data lake to improve correlation between keyword notes and keyword outcomes, wherein the keyword notes and the keyword outcomes are associated to the keyword library.

The system 10 further includes an outcome representation module 90 configured to represent the at least one outcome probability in a pre-defined format. In one embodiment, the pre-defined format may include one of a graph, a table, a chart, a pictorial representation or a combination thereof. In such embodiment, parameters associated to represent the outcome probability may be pre-defined by the authorized user or by the one or more users. In one specific embodiment, the parameters associated to represent the outcome probability may be customized based on the requirements.

In one exemplary embodiment, the system 10 may further include an action receiving module which may be configured to receive a kind of action to be performed on the one or more videos. On receiving the same, the action receiving module may be configured to analyse the one or more videos again and may generate a refined report.

Figure 2:
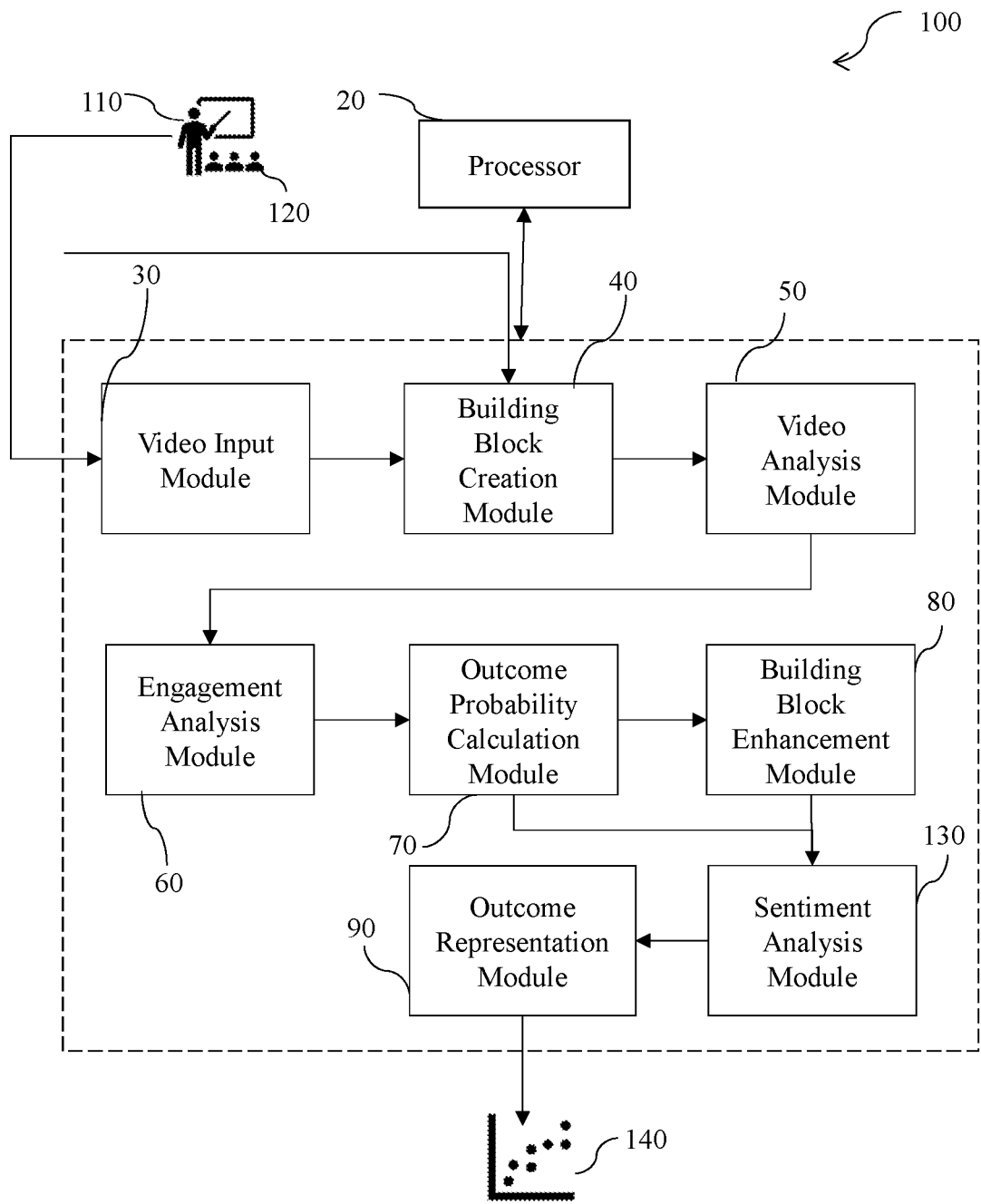
FIG. 2 is a block diagram representation of an exemplary embodiment of the system to determine an outcome probability of a seminar based on one or more video recordings of FIG. 1 in accordance with an embodiment of the present disclosure.

FIG. 2 is a block diagram representation of an exemplary embodiment of the system 100 to determine an outcome probability of a seminar based on one or more video recordings of FIG. 1 in accordance with an embodiment of the present disclosure. A speaker 110 along with multiple participants 120 arranges the seminar (which we assume to be held on a day 'X' dated 'Y'). Further multiple videos of the seminar may be recorded and multiple recorded videos may be transmitted to the video input module 30 by the speaker 110.

Further, a building block model associated to the seminar would be created by a building block creation module 40 using the ML and the AI techniques. The building block model is built to analyse the outcome probability of the seminar. On creating the building block model, audio content and video content is extracted from the multiple recorded videos by a video analysis module 50. Consequently, the extracted content is analysed using the ML and the AI technique via the building block model. Post the analysis, interaction between the speaker 110 and the participants 120, keywords used during the seminar, behavior during the seminar, and the like is analysed and an analysis result is generated.

In addition, engagement between the speaker 110 and the multiple participants 120 is also analysed by an engagement analysis module 60. Multiple queries raised by the multiple participants and how the speaker 110 responded for the corresponding queries of the user were also analysed by an engagement analysis module 60. Also, the outcome probability of the seminar is computes using all the analysed results and feedback given by the participants after the seminar was over by an outcome probability calculation module 70. The outcome probability generated was that the seminar was very interactive and a good learning experience for the participants. The feedback provided by the participants had multiple view which was later fed to the building block enhancement module 80 to enhance the learning and the performance of the building block model. Also, the sentiment between the speaker 110 and the multiple participants 120 is also analysed by a sentiment analysis module 130. As a result, the outcome probability is represented in a form of a graph 140 by an outcome representation module 90.

It should be noted that, all the above-described modules of FIG. 2 are operable by one or more processors 20. Furthermore, the system 100, the video input module 30, the building block creation module 40, the video analysis module 50, the engagement analysis module 60, the outcome probability calculation module 70, the building block enhancement module 80 and the outcome representation module 90 of FIG. 2 are substantially similar to a system 10, a video input module 30, a building block creation module 40, a video analysis module 50, an engagement analysis module 60, an outcome probability calculation module 70, a building block enhancement module 80 and an outcome representation module 90 of FIG. 1, and all the embodiments described in FIG. 1 applies to corresponding modules of FIG. 2.

Figure 3:
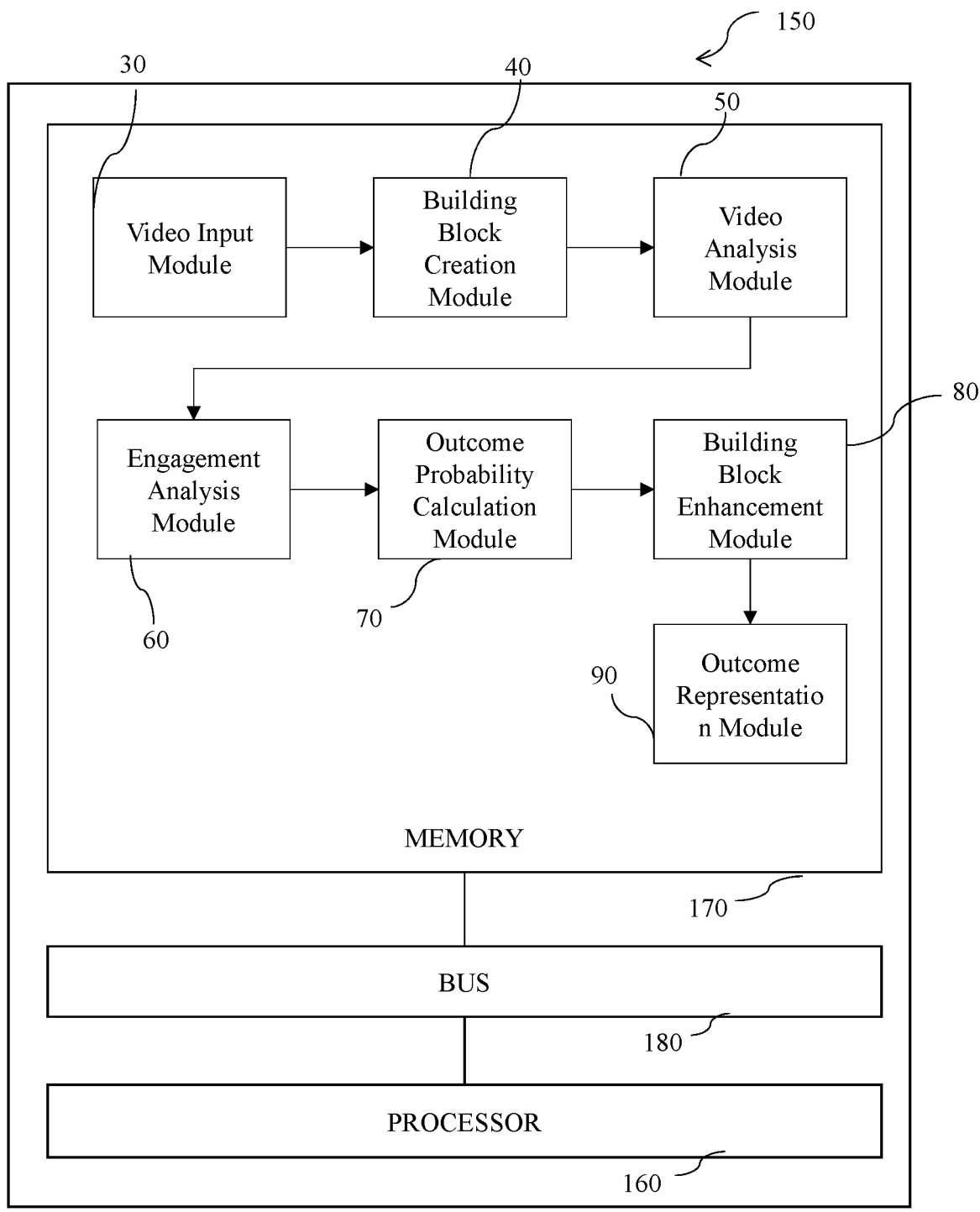
FIG. 3 is a block diagram representation of a processing subsystem located on a local server or on a remote server in accordance with an embodiment of the present disclosure.

FIG. 3 is a block diagram representation of a processing subsystem located on a local server or on a remote server in accordance with an embodiment of the present disclosure. The server 150 includes processor(s) 160, and memory 170 operatively coupled to the bus 180.

The processor(s) 160, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a digital signal processor, or any other type of processing circuit, or a combination thereof.

Figure 4A:
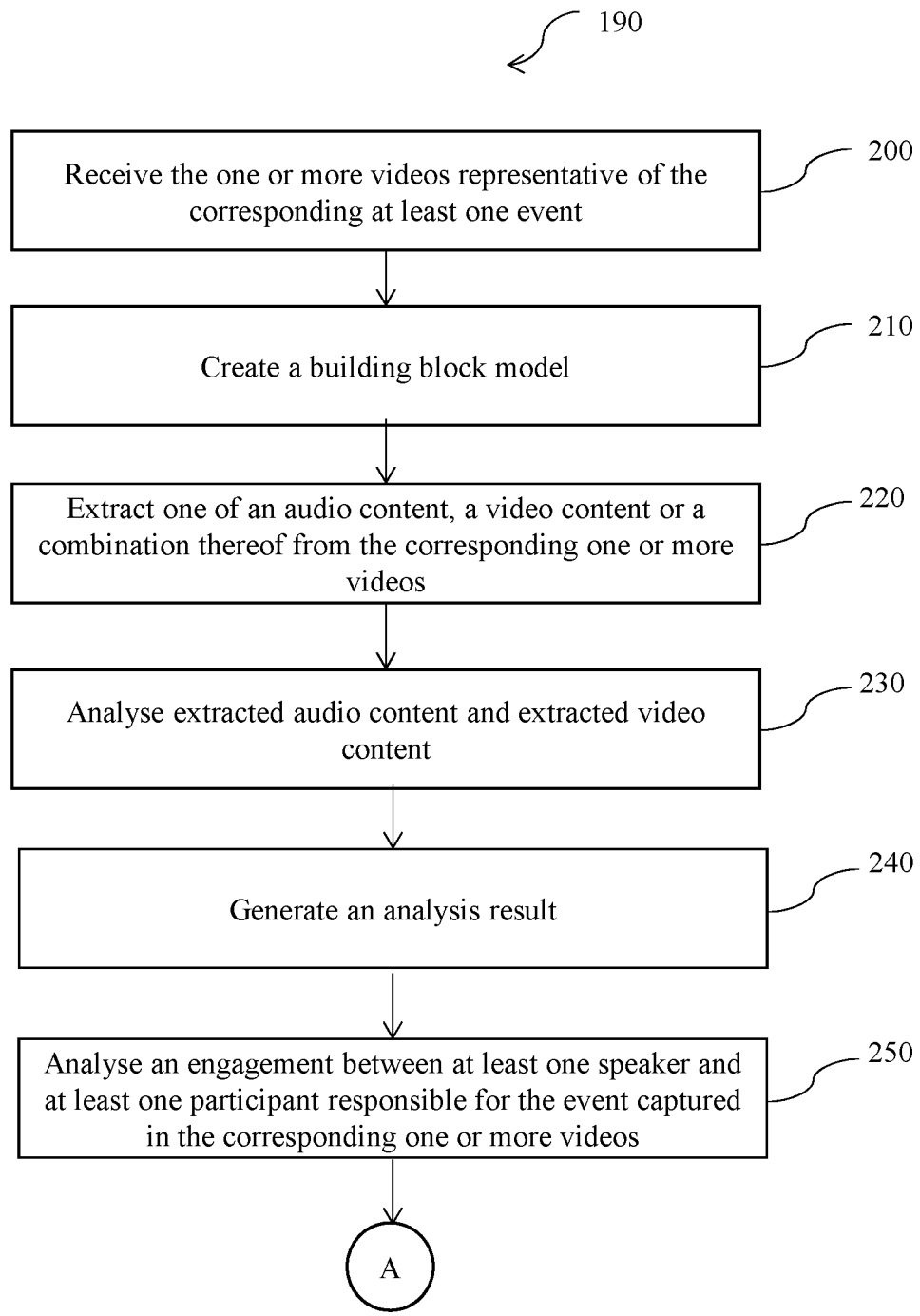
FIG. 4a and FIG. 4b are flow charts representing steps involved in a method for determining at least one outcome probability of an event based on one or more videos in accordance with an embodiment of the present disclosure.
Figure 4B:
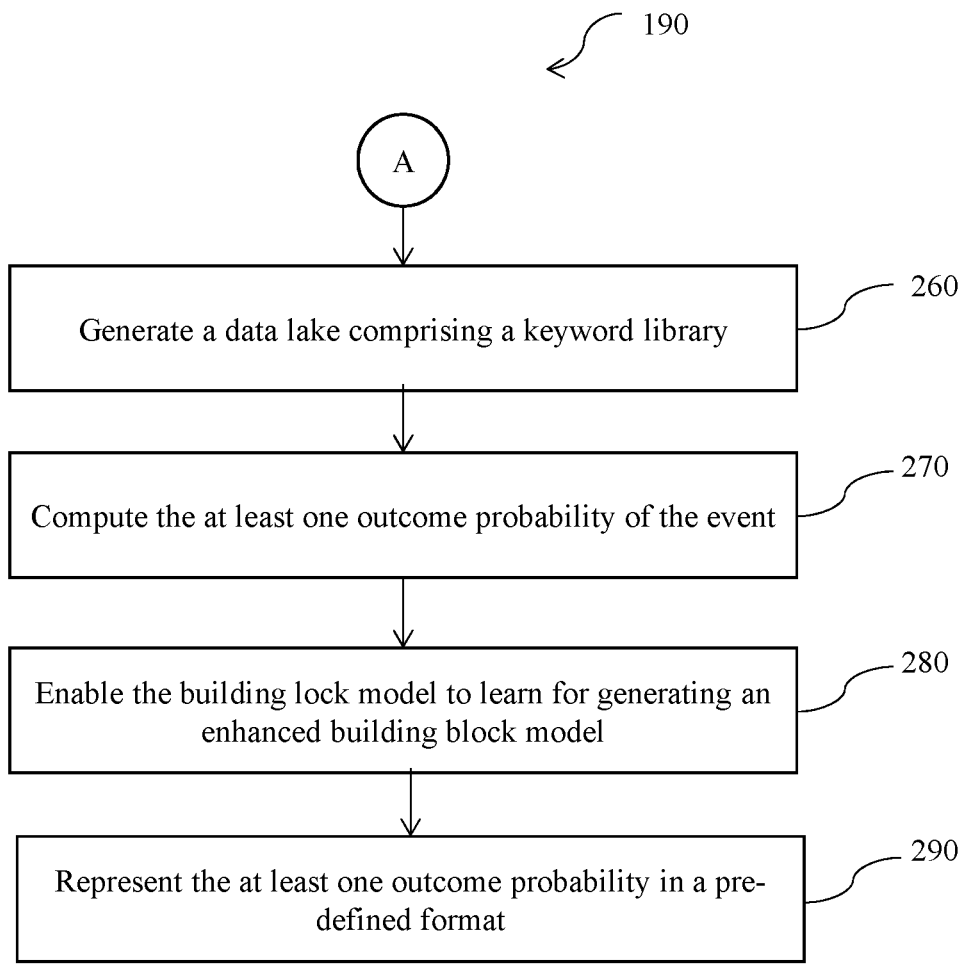

The memory 170 includes a plurality of modules stored in the form of executable program which instructs the processor 160 to perform the method steps illustrated in FIG. 4a and FIG. 4b. The memory 170 is substantially similar to the system 10 of FIG. 1. The memory 170 has the following modules: a video input module 30, a building block creation module 40, a video analysis module 50, an engagement analysis module 60, an outcome probability calculation module 70, a building block enhancement module 80 and an outcome representation module 90.

The video input module 30 is configured to receive the one or more videos representative of the corresponding at least one event, from one or more users. The building block creation module 40 is configured to create a building block model. The video analysis module 50 is configured to extract one of an audio content, a video content or a combination thereof from the corresponding one or more videos, to analyse extracted audio content and extracted video content and to generate an analysis result, The engagement analysis module 60 is configured to analyse an engagement between at least one speaker and at least one participant responsible for the event captured in the corresponding one or more videos, based on the analysis result. The outcome probability calculation module 70 is configured to generate a data lake comprising a keyword library based on the analysis result and an analysed engagement and to compute the at least one outcome probability of the event using the building block model and a probability input received from the one or more users. The building block enhancement module 80 is configured to enable the building block model to learn from the data lake and the at least one outcome probability computed. The outcome representation module 90 represent the at least one outcome probability in a pre-defined format.

FIG. 4a and FIG. 4b are flow charts representing steps involved in a method 190 for determining at least one outcome probability of an event based on one or more videos in accordance with an embodiment of the present disclosure. The method 190 includes receiving the one or more videos representative of the corresponding at least one event in step 200. In one embodiment, receiving the one or more videos may include receiving the one or more videos by a video input module. In one exemplary embodiment, receiving the one or more videos may include receiving the one or more videos representative of one of a seminar, a meeting, an educational gathering, a social gathering or a private gathering.

The method 190 also includes creating a building block model using one of an artificial intelligence technique, a machine learning technique or a combination thereof in step 210. In one embodiment, creating the building block model may include creating the building block model by a building block creation module.

The method 190 also includes extracting one of an audio content, a video content or a combination thereof from the corresponding one or more videos in step 220. In one embodiment, extracting the content may include extracting the content by a video analysis module. In one exemplary embodiment, extracting the content may include extracting the content based on a pre-defined set of extraction instruction or a pre-defined set of extraction rules which may be defined by the authorized user or the corresponding one or more users.

Furthermore, the method 190 includes analysing extracted audio content and extracted video content using one of an image processing technique, the machine learning technique, the artificial intelligence technique, a face recognition technique, a voice recognition technique, or a combination thereof in step 230. In one embodiment, analysing the extracted content may include analysing the extracted content by the video analysis module. In one exemplary embodiment, the method 190 may further include identifying a tone of the voice, a type of language used, a prosody of the voice, kindly of words used, content of communication, or the like by the one or more users in the corresponding one or more videos.

The method 190 also includes generating an analysis result in step 240. In one embodiment, generating the analysis result may include generating the analysis result by the video analysis module.

The method 190 also includes analysing an engagement between at least one speaker and at least one participant responsible for the event captured in the corresponding one or more videos, based on the analysis result in step 250. In one embodiment, analysing the engagement may include analysing the engagement by an engagement analysis module. In one exemplary embodiment, analysing the engagement may include analysing the engagement using one of the AI or the ML techniques.

In one exemplary embodiment, the method 190 may further include analysing a sentiment between the at least one speaker and the at least one participant, based on the analysis result and an analysed engagement. In such embodiment, analysing the sentiment may include analysing the sentiment by a sentiment analysis module.

The method 190 also includes generating a data lake comprising a keyword library based on the analysis result and an analysed engagement in step 260. In one embodiment, generating the data lake may include generating the data lake by an outcome probability calculation module.

Furthermore, the method 190 includes computing the at least one outcome probability of the event using the building block model and a probability input received from one or more users in step 270. In one embodiment, computing the at least one outcome probability may include computing the at least one outcome probability by the outcome probability calculation module. In one exemplary embodiment, computing the at least one outcome probability may include computing generating a menu comprising one or more moments, the pattern of keywords, one or more highlights, sentiment between the one or more users, or the like.

In another exemplary embodiment, computing the at least one outcome probability may include computing one of the engagement, the sentiment, keywords used, between the at least one speaker and the at least one participant, or between the one or more users. In yet another exemplary embodiment, computing the at least one outcome probability may include computing one of customer purchase, high performer, weak performer, employee leaving, depression, substance abuse, or the like.

The method 190 also includes enabling the building block model to learn from the data lake and the at least one outcome probability computed, using the machine learning technique, for generating an enhanced building block model in step 280. In one embodiment, enabling the building block model to learn may include enabling the building block model to learn by a building block enhancement module.

In one exemplary embodiment, the method 190 may further include enhancing the data lake to improve correlation between keyword notes and keyword outcomes, wherein the keyword notes and the keyword outcomes are associated to the keyword library. In such embodiment, enhancing the data lake may include enhancing the data lake by a data lake enhancement module.

The method 190 also includes representing the at least one outcome probability in a pre-defined format in step 290. In one embodiment, representing the at least one outcome probability may include representing the at least one outcome probability by an outcome representation module. In one exemplary embodiment, representing the at least one outcome probability may include representing the at least one outcome probability in one of a graph, a table, a chart, a pictorial representation or a combination thereof.

Various embodiments of the present disclosure enable the system to analyse the behavior of the participants in the event which is captured in the video. Further, using the ML and the AI technique, the emotions, sentiments, the behavior, content, keywords and the like are analysed by the system. Since every minute details are analysed and also learnt from the feedback of the user, the system becomes more accurate and reliable in terms of analysis. In addition, since the system keeps learning, the system is more efficient in terms of its performance. Also, the system provides a customized way of representing the analysed outcome probability of the system which makes it very simple for any user to understand the outcome probability, thereby making the system more unique and user friendly.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, the order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

We claim:

1. A system for determining an outcome probability of an event based on one or more videos, the system comprising:
   one or more processors;
   a video input module, operable by the one or more processors, configured to receive the one or more videos representative of at least one event;
   a building block creation module, operable by the one or more processors, configured to create a building block model;
   a video analysis module, operable by the one or more processors, configured to:
      extract an audio content, a video content or a combination thereof from the one or more videos; and
      analyze extracted audio content and extracted video content to generate an analysis result;

an engagement analysis module, operable by the one or more processors, configured to analyze an engagement between at least one speaker and at least one participant associated with the event captured in the one or more videos based on the analysis result;

an outcome probability calculation module operable by the one or more processors, and configured to:
  generate a data lake comprising a keyword library based on the analysis result and an analyzed engagement; and
  compute an outcome probability of the event using the building block model and a probability input received from at least one user;

a building block enhancement module, operable by the one or more processors, configured to enable the building lock model to learn from the data lake and the computed outcome probability, and to generate an enhanced building block model; and an outcome representation module, operable by the one or more processors, configured to represent the outcome probability in a pre-defined format.

2. The system of claim 1, wherein the event comprises a seminar, a meeting, an educational gathering, a social gathering or a private gathering.

3. The system of claim 1, wherein the user comprises the at least one speaker, the at least one participant, or a combination thereof.

4. The system of claim 1, wherein the at least one participant corresponds to one or more users listening or interacting with the at least one speaker in the event.

5. The system of claim 1, wherein the pre-defined format comprises a graph, a table, a chart, a pictorial representation or a combination thereof.

6. The system of claim 1, further comprising a sentiment analysis module, operable by the one or more processors, configured to analyze a sentiment between the at least one speaker and the at least one participant based on the analysis result and an analyzed engagement.

7. The system of claim 6, wherein the outcome probability comprises the engagement, the sentiment and keywords used between the at least one speaker and the at least one participant.

8. The system of claim 1, further comprising a data lake enhancement module, operable by the one or more processors, configured to enhance the data lake to improve correlation between keyword notes and keyword outcomes, wherein the keyword notes and the keyword outcomes are associated with the keyword library.

9. A method of determining an outcome probability of an event based on one or more videos, the method comprising:
  receiving, by a video input module, the one or more videos representative of at least one event;
  creating, by a building block creation module, a building block model;
  extracting, by a video analysis module, an audio content, a video content or a combination thereof from the one or more videos;
  analyzing, by the video analysis module, extracted audio content and extracted video content to generate an analysis result;
  analyzing, by an engagement analysis module, an engagement between at least one speaker and at least one participant associated with the event captured in the one or more videos based on the analysis result;
  generating, by an outcome probability calculation module, a data lake comprising a keyword library based on the analysis result and an analyzed engagement;
  computing, by the outcome probability calculation module, the outcome probability of the event using the building block model and a probability input received from at least one user;
  enabling, by a building block enhancement module, the building block model to learn from the data lake and the computed outcome probability, and to generate an enhanced building block model; and
  representing, by an outcome representation module, the outcome probability in a pre-defined format.

10. The method of claim 9, wherein the event comprises a seminar, a meeting, an educational gathering, a social gathering or a private gathering.

11. The method of claim 9, wherein the user comprises at least one speaker, the at least one participant, or a combination thereof.

12. The method of claim 9, wherein the at least one participant corresponds to one or more users listening or interacting with the at least one speaker in the event.

13. The method of claim 9, wherein the pre-defined format comprises a graph, a table, a chart, a pictorial representation or a combination thereof.

14. The method of claim 9, further comprises analyzing, by a sentiment analysis module, a sentiment between the at least one speaker and the at least one participant, based on the analysis result and an analyzed engagement.

15. The method of claim 14, wherein the outcome probability comprises the engagement, the sentiment and keywords used between the at least one speaker and the at least one participant.

16. The method of claim 9, further comprising enhancing, by a data lake enhancement module, the data lake to improve correlation between keyword notes and keyword outcomes, wherein the keyword notes and the keyword outcomes are associated with the keyword library.

* * * * *